March 7, 1967 KARL-HEINZ GINSBACH ETAL 3,307,240

METHOD FOR MAKING A SEMICONDUCTOR DEVICE

Filed Dec. 23, 1963 2 Sheets-Sheet 1

Inventors:
Karl-Heinz Ginsbach
Aloys Sonntag
By: Spencer & Kaye
ATTORNEYS

March 7, 1967 KARL-HEINZ GINSBACH ETAL 3,307,240

METHOD FOR MAKING A SEMICONDUCTOR DEVICE

Filed Dec. 23, 1963 2 Sheets-Sheet 2

Inventors:
Karl-Heinz Ginsbach
Aloys Sonntag
By: Spencer & Kaye
ATTORNEYS

United States Patent Office 3,307,240

Patented Mar. 7, 1967

3307,240

METHOD FOR MAKING A SEMICONDUCTOR DEVICE

Karl-Heinz Ginsbach, Belecke-Mohne, and Aloys Sonntag, Sichtigvor uber Soest, Germany, assignors to Licentia Patent-Verwaltungs-G.m.b.H., Frankfurt am Main, Germany Filed Dec. 23, 1963, Ser. No. 332,807
Claims priority, application Germany, Dec. 24, 1962, L 43,779
11 Claims. (Cl. 29—25.3)

The present invention relates generally to semiconductor devices and more particularly to such devices having chamfered edges.

Semiconductor arrangements are known wherein a silicon semiconductor device which can be controlled is provided with four successive layers of alternate type conductivity and a cathode contact, an anode contact, and a control electrode contact. In order to produce these controllable silicon semiconductor devices, a method may be used which is set forth below with reference to explanatory FIGURES 1 and 2.

A circular disc-like n-conductive silicon slab 1 is provided with a continuous p-conductive zone 2 by diffusing a p-doping substance into the slab. This zone 2 is parallel with the entire surface and borders on the entire surface of the slab. Using a drilling or sawing device, the edge of the disc is cut from the silicon slab along lines 3 and at right angles to the larger slab surfaces. The thickness of the cut which is made is larger than the width of the diffusion layer 2 so that the lateral or side portions of this layer are removed.

The p-conductive layers 2 and 4 extend parallel to the larger slab surfaces and the n-conductive layer 1 extends parallel to these slab surfaces. The anode contact 6 is alloyed on the surface 5 in such a manner that no barrier layer is provided. On the other slab surface 7 a control electrode contact 8 is alloyed in a manner which does not produce a barrier layer and the alloying takes place into layer 2. The cathode contact 9 is also alloyed into the layer 2 but this is done in such a manner that an n-conductive cathode layer 10 is formed within the layer 2.

In order to utilize the entire slab surface the anode contact 6 is constructed to be of the same size as the slab surface 5. When alloying the anode contact 6 to the very thin layer 4, a short circuit can very readily occur at the edge of the pn-junction between the layers 1 and 4 and this short circuit bridges the layer 4 which may be about 70$\mu$.

With these defects of the prior art in mind, it is the main object of the present invention to avoid the above-mentioned disadvantages of the prior art and yet render it possible to utilize a contact area which extends up to the slab edge.

Another object of the invention is to provide a method of constructing a semiconductor device which has further substantial advantages over the prior art.

These objects and other ancillary thereto are accomplished in accordance with preferred embodiments of the present invention wherein the initial steps in the construction of prior art devices are utilized. That is, a slab of material of one type conductivity is used and a surrounding layer of another type conductivity is provided. Then, on one slab surface a contact is provided which extends up to the edges of the surface whereas on the other slab surface two contacts which are spaced from each other and which are spaced from the edges of the surface are provided. One of these is an ohmic connection and the other provides a barrier layer. The large surface contact on the other surface is also an ohmic connection. Then, a chamfer is provided between the surface on which the two contacts are provided down through the two pn-junctions which are formed by diffusion of one type conductivity into a slab of the other type conductivity. This angled surface assures that the distance between these two pn-junctions along the beveled surface will, at a minimum, be greater than the shortest distance between the pn-junctions throughout the remainder of the semiconductor device and thereby short-circuiting which had previously been a problem in the prior art, is effectively avoided.

Additional objects and advantages of the present invention will become apparent upon consideration of the following description when taken in conjunction with the accompanying drawings in which.

Before describing the drawings of the present invention in detail, it should be noted that in accordance with the present invention a semiconductor device is provided by starting with a semiconductor slab having a layer of one type conductivity which is substantially parallel to the larger slab surface. This layer is surrounded on all sides by a zone of opposite conductivity by using a diffusion process. A contact which extends up to the slab edge of one of the slab surfaces is alloyed into this surface and on the other slab surface one or two contacts are provided which are spaced a distance apart from the slab edge. Then, by means of a grinding process, a chamfer is formed along the periphery of the slab edge starting at the slab surface in which the one or two contacts spaced from the disc edge are provided and the chamfer extends along the entire periphery. This chamfering is provided in such a manner that the pn-junction between the diffusion zone and the layer surrounded by the diffusion zone is separated into two pn-junctions which are no longer connected as they previously had been. The intersections of these two junctions with the chamfered surface have a minimum distance from each other along this surface which is larger than the shortest distance between the two pn-junctions thus formed.

In a preferred embodiment of the invention, an anode contact which extends up to the slab edge is alloyed into one surface of the silicon slab which has a layer of n-type conductivity and which is substantially parallel to the larger slab surface. This n-conductive layer is surrounded on all sides by a p-conductive diffusion zone. The alloying of the anode contact is performed in such a manner that a barrier layer is not created. A cathode contact is alloyed to the other slab surface and is spaced from the slab edge in such a manner that a pn-junction is formed.

Also, a control electrode contact which is spaced from the slab edge by a certain distance is alloyed to this slab surface in a manner which produces no barrier layer.

Next a chamfer is formed by grinding the slab edge and starting at the slab surface provided with the cathode contact and with the control electrode contact, with the chamfering extending along the entire periphery. The grinding is done in such a manner that the pn-junction between the p-conductive diffusion zone and the n-conductive layer which is surrounded by the diffusion zone is separated into two pn-junctions which are no longer connected with each other. Along those places where the pn-junctions intersect with the chamfered surface there is a minimal spacing between these junctions along the chamfered surface which is larger than the shortest distance between the two pn-junctions.

Figure 3:
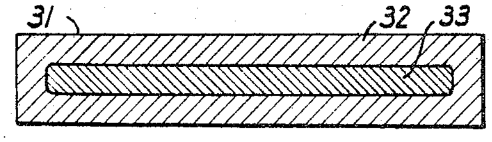
FIGURE 3 is a schematic sectional view of a first step which is taken in constructing the present invention and wherein the diffusion step has been completed.

With more particular reference to the drawings, FIGURE 3 illustrates a silicon slab 31 which is initially of n-type conductivity and which may be circular and disc-like although other configurations may also be used. FIGURE 3 is a schematic sectional view. A doping material which produces p-type conductivity is diffused into this silicon slab on all sides so that a p-conductive zone 32 surrounding the entire surface is provided and has a thickness which is substantially uniform. This p-conductive zone 32 surrounds an n-conductive layer 33 which is substantially parallel to the larger surfaces of the slab.

Figure 4:
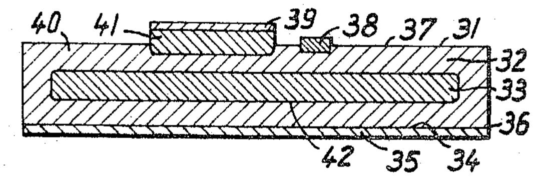
FIGURE 4 is a schematic sectional view similar to FIGURE 3 illustrating another step in the process and wherein contacts are provided on the device.

As shown in FIGURE 4, an anode contact 35 is connected to the silicon slab 31 and this may, for example, be a p-doping metal foil which is alloyed at the slab surface 34. This anode contact 35 covers the entire slab surface 34 and extends up to the edges 36 of the slab. A control electrode contact 38 which may be, for example, a p-doping and small area metal foil is alloyed onto the other slab surface 37. This contact 38 is spaced from the slab edge by a certain distance. A cathode contact 39 which may, for example, be an n-doping metal foil is alloyed onto the slab surface 37 in addition to the control electrode contact 38. This cathode contact 39 is also spaced from the slab edge by a certain distance and the two contacts are also spaced from each other.

The alloying of the cathode contact 39 takes place in a portion 40 of the p-conductive zone 32 bordering on the slab surface 37 and due to this alloying an n-conductive cathode layer 41 is produced.

The control electrode contact 38 may also be provided by evaporation or electrolytic deposition of a metal coating or by some other method. This is done in such a manner that no barrier layer is produced and thus an ohmic connection is provided. Also, an n-conductive cathode layer 41 may be produced in the portion 40 of the p-conductive zone 32 which is not covered by the control electrode contact 39 by means of diffusing an n-doping substance into this portion 40. The cathode layer 41 may be provided by evaporation or electrolytic deposition of a metal layer or by some other method wherein a barrier layer is not formed so that an ohmic connection is formed. Thus, as shown in FIGURE 4, the silicon slab 31 is provided with contacts 35, 38 and 39.

Figures 5, 6, 7:
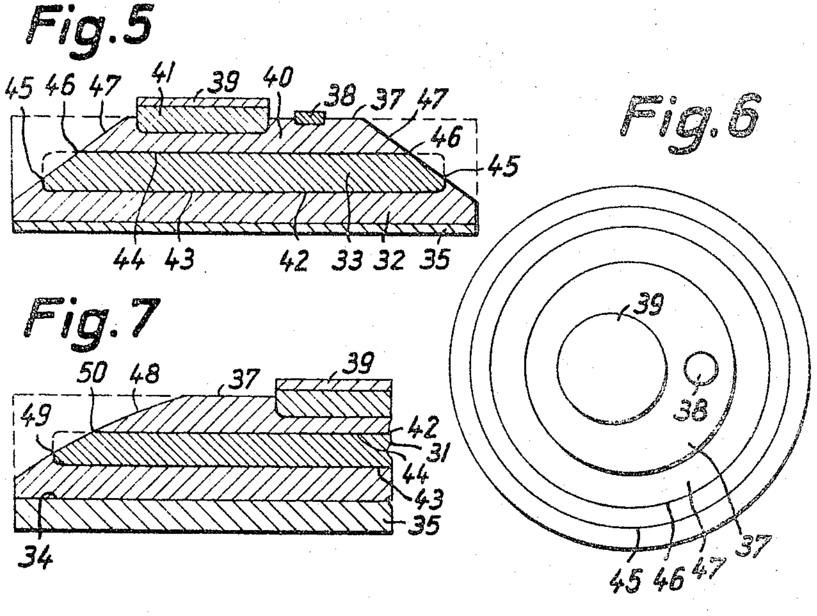
FIGURE 5 is a schematic sectional side view of the invention after the chamfering operation.
FIGURE 6 is a plan view of the invention.
FIGURE 7 is an enlarged schematic sectional view of another embodiment of the present invention.

As shown in FIGURE 5, a chamfer or bevel is provided by grinding the upper edge of the slab starting from the slab surface 37 and extending peripherally along the edge. The grinding is performed so that the pn-junction 42 between the n-conductive layer 33 and the p-conductive zone 32 is divided into two pn-junctions 43 and 44 which are not connected to each other as they would be had the grinding not been performed. The lines of intersection 45 and 46 of the two pn-junctions 43 and 44, respectively, with the chamfered surface 47 have a minimal spacing from each other, along the surface 47, which is larger than the shortest distance between the pn-junctions 43 and 44. For example, the surface 47 is ground so that the slab has a shape which is the generated surface of a truncated triangle or a truncated cone whose base is parallel to the slab surfaces 34 and 37. FIGURE 6 is a plan view of such a construction.

The grinding can be done advantageously with the use of grinding devices and grinding means which provide a fine abrasion which is as disturbance-free as possible with respect to the crystal lattice of the silicon slab. Bevelling by means of sawing or ultrasonic drilling would be disadvantageous. Grinding machines in accordance with the prior art are described, for example, in "Encyclopaedia Britannica," volume 10, pages 898/899, Encyclopaedia Britannica, Inc., William Bentor, Publisher, Chicago, 1962. Suitable grinding machines and grinding means are the known machines and means used for lens shaping or other optical work.

Another embodiment of the invention is shown in FIGURE 7, which is a fragmentary sectional view of a silicon semiconductor device. A chamfer is provided along a surface 48 which is ground after the contacts 35, 38 (not shown in this figure), and 39 have been alloyed into the silicon slab 31 which is, in this case, circular and disc-like. The chamfering takes place at the slab edge beginning from surface 37 and extending along the edge. This surface 48 has the form of the generated surface of a truncated semicircle or a truncated hemisphere with a base parallel to the plate surfaces 34 and 37. This chamfering divides the pn-junction 42 into two pn-junctions 43 and 44 which are not connected with each other. This is done in such a manner that the lines of intersection 49 and 50 of the pn-junctions 43 and 44, respectively, that is, the intersection of lines 49 and 50 with the surface 48 have a minimal spacing from each other along the surface 48 which is larger than the shortest distance between the pn-junctions 43 and 44 from each other. A plan view of the arrangement produced in this manner would also appear as shown in FIGURE 6.

Preferably a circular disc-like semiconductor slab is used, but also advantageous is the use of a rectangular or square semiconductor slab.

When a circular disc-like semiconductor slab is used, the chamfer may be ground in such manner that a surface is formed which is in the shape of a truncated cone having a base which is parallel to the larger or bottom slab surface. Advantageously, a chamfer may be ground into a circular disc-like semiconductor slab which is in the shape of a truncated pyramid having a base which is parallel to the larger or bottom slab surface. It is advantageous to grind a chamfer which has a surface in the shape of a truncated hemisphere having a base which is parallel to the larger or bottom slab surface.

In the event a rectangular semiconductor slab is used, the chamfer may be suitably ground to have a surface which is in the shape of a truncated pyramid having a base which is parallel to the larger slab surface and in particular with the edges of the base being in the plane of the narrow sides of the semiconductor slab. It is of advantage to grind a chamfer into a rectangular semiconductor slab which forms a surface of respectively two portions of two circular cylinders, the axis of one circular cylinder being parallel to one of the narrow sides of the semiconductor slab and the axis of the other circular cylinder being at right angles to the axis of the first-mentioned circular cylinder.

In the event that a square semiconductor slab is used, a chamfer may be suitably ground which has the shape of a truncated pyramid and with a base which is parallel to the larger slab surface with the edges of the base particularly being in the plane of the narrow sides of the semiconductor slab. Advantageously, a chamfer may be ground into a square semiconductor slab which has a surface in the shape of a truncated hemisphere with the base being parallel to the larger slab surface. An advantageous feature is the grinding of a chamfer which forms a surface composed of respectively two portions of two circular cylinders, with the axis of one circular cylinder being parallel to one narrow side of the semiconductor slab, and the axis of the other cylinder being at right angles to the cylinder of the first-mentioned circular cylinder.

Figure 8:
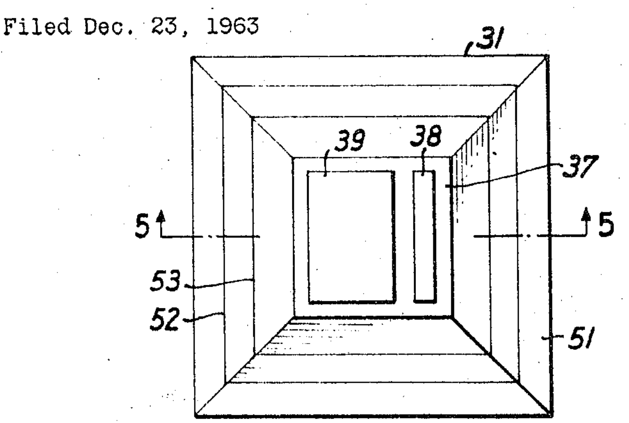
FIGURE 8 is a schematic plan view of a further embodiment of the present invention.

A further embodiment of the invention can be considered as being shown in FIGURE 8. FIGURE 8 is a plan view of a square silicon slab and its contacts and is a partially schematic view. A sectional view through the arrangement of FIGURE 8 along line 5—5 would appear in configuration as shown in FIGURE 5 although different reference characters are used.

After the contacts 35, 38 and 39 are alloyed to the square silicon slab 31, a chamfer surface 51 is ground along the slab edge starting from the slab surface 37 and along the entire peripheral edge. This surface 51 forms a truncated pyramid with the sides of the base being the upper peripheral edges of the silicon slab. The pn-junction is divided into two pn-junctions by means of the chamfered surface 51. These latter junctions are no longer connected with each other. The lines of intersection 52 and 53 of these pn-junctions with the surface 51 have a minimal distance along surface 51 which is larger than the shortest distance between the pn-junctions.

Figures 9, 10:
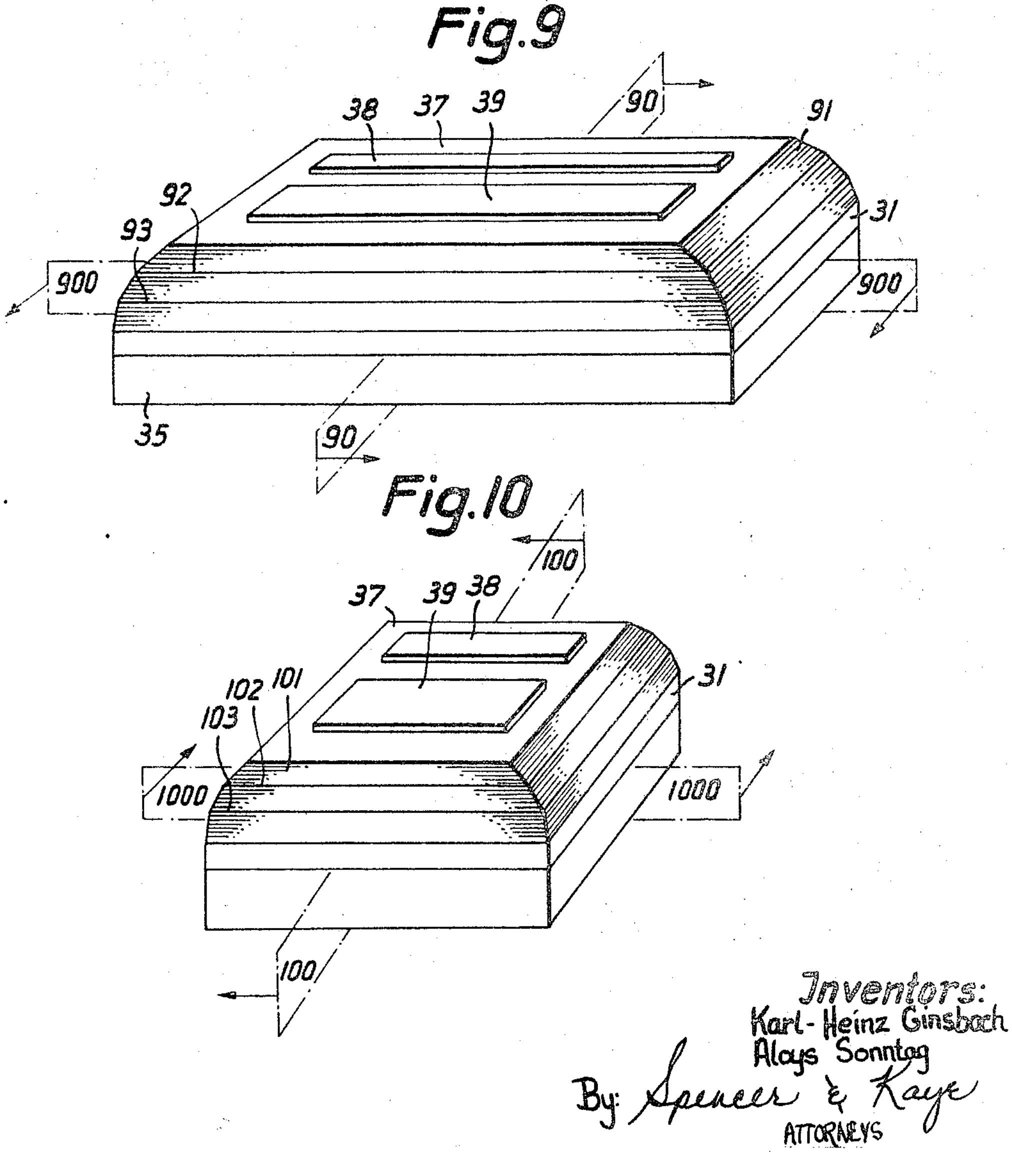
FIGURE 9 is a schematic perspective view of another configuration of the present invention.
FIGURE 10 is a schematic perspective view of the present invention as in FIGURE 9 but slightly modified.

FIGURE 9 shows the configuration of the present invention which is provided when the semiconductor slab 31 is originally rectangular and the chamfer is such that a surface 31 is formed which comprises portions of the two circular cylinders with the axis of one circular cylinder being parallel to one of the narrow sides of the slab 31, and both the axis of the other circular cylinder being at right angles to the axis of the first-mentioned circular cylinder and parallel to the other of the narrow sides of the slab. The diameter of the two circular cylinders is the same. A sectional view through the arrangement of FIGURE 9 as well along plane 90—90 as along plane 900—900 would appear in configuration as shown in FIGURE 7 although different reference characters are used.

After the contacts 35, 38 and 39 are alloyed to the rectangular silicon slab 31, a chamfer surface 91 is ground along the slab edge starting from the slab surface 37 and along the entire peripheral edge. This surface 91 forms parts of the lateral area of a circular cylinder a truncated pyramid with the sides of the base being the edges of the silicon slab. The pn-junction is divided into two pn-junctions by means of the chamfered surface 91. These latter junctions are no longer connected with each other. The lines of intersection 92 and 93 of these pn-junctions with the surface 91 have a minimal distance along surface 91 which is larger than the shortest distance between the pn-junctions.

FIGURE 10 shows the configuration of the present invention which is provided when the semiconductor slab 31 is originally square and the chamfer is such that a surface 101 is formed which comprises portions of two circular cylinders with the axis of one circular cylinder being parallel to one of the narrow sides of the slab 31, and both the axis of the other circular cylinder being at right angles to the axis of the first-mentioned circular cylinder and parallel to the other of the narrow sides of the slab. The diameter of the two circular cylinders is the same. A sectional view through the arrangement of FIGURE 10 as well along plane 100—100 as along plane 1000—1000 would appear in configuration as shown in FIGURE 7 although different reference characters are used.

After the contacts 35, 38 and 39 are alloyed to the square silicon slab 31, a chamfer surface 101 is ground along the slab edge starting from the slab surface 37 and along the entire peripheral edge. This surface 101 forms parts of the lateral area of a circular cylinder, a truncated pyramid with the sides of the base being the edges of the silicon slab. The pn-junction is divided into two pn-junctions by means of the chamfered surface 101. These latter junctions are no longer connected with each other. The lines of intersection 102 and 103 of these pn-junctions with the surface 101 have a minimal distance along surface 101 which is larger than the shortest distance between the pn-junctions.

In accordance with the method of the present invention, a silicon semiconductor device capable of being controlled can be manufactured starting with a p-conductive layer which is surrounded by two n-conductive diffusion layers and wherein the cathode contact on one slab surface extends up to the edge of the slab, with the anode contact and the control electrode contact of the other slab surface remaining spaced a certain distance from the slab edge, the anode contact bordering on a p-conductive anode layer.

In accordance with the invention, the method is such that an n-conductive layer is provided on a silicon slab which layer is at least substantially parallel to the slab surface and is encompassed on all sides by a p-conductive diffusion zone. A collector contact is alloyed into one slab surface in such a manner that a barrier layer is not produced but an ohmic connection is provided. This contact extends up the slab edge and on the other slab surface an emitter contact is alloyed in a manner which also does not produce a barrier layer but rather is an ohmic connection. This emitter contact is spaced a certain distance from the slab edge. Furthermore, a base contact is spaced a distance from the slab edge and is alloyed through the p-conductive diffusion zone. The base contact forms a pn-junction with respect to the conductive diffusion zone and is alloyed in such a manner that no barrier layer is formed with respect to the n-conductive layer encompassed by the diffusion zone. Subsequently, chamfering is performed by means of grinding along the slab edge starting at the slab surface having the emitter contact and the base contact and along the entire periphery in such a manner that the pn-junction surface between the p-conductive diffusion zone and the n-conductive layer encompassed by the former is divided into two pn-junctions which are not connected with each other. The lines of intersection of these junctions with the chamfered surface have a minimal distance from each other along this surface which is larger than the shortest distance between the two formed pn-junctions.

In accordance with the invention, a contact is provided on one surface of a silicon slab having an n-conductive layer substantially parallel to the slab surface and surrounded on all sides by a p-conductive diffusion layer. This contact extends to the slab edge and on the other slab surface a contact is provided which is spaced from the slab edge. Both these contacts are provided without forming a barrier layer. Then, a chamfer is ground beginning at the slab edge of that surface which has the contacts spaced from the slab edge. This chamfering extends along the entire periphery and is done in such a manner that the pn-junction between the p-conductive diffusion zone and the n-conductive layer surrounded by the former zone is divided into two pn-junctions which are not connected with each other and having lines of intersection with the chamfered surface which are spaced a minimal distance from each other along this surface which is larger than the shortest distance between the two pn-junctions which are formed.

In accordance with the invention, semiconductor arrangements can be made having a semiconductor slab of silicon, germanium or semiconductor compounds of elements of the third and fifth group of the periodic system of elements having advantageous properties.

The present invention will be described in greater detail with reference to the example below and to the FIGURES 3, 4, 5 and 8. A square silicon slab 31 which is of n-type conductivity having a resistivity of 40 ohm cm. is heated in a non-oxidizing atmosphere which contains gallium vapor for about 40 to 50 hours at a temperature of about 1240° C. After the p-type doping material gallium is diffused into the square silicon slab 31 which has a length of about 8 mm. and is 0.3 mm. thick, on all sides of the square wafer 31 has 0.07 mm. thick zone 32 p-type conductivity. This p-conductive zone 32 of 0.07 mm. thickness surrounds an n-conductive layer 33 of 0.16 mm. thickness which is substantially parallel to the layer surface of the square slab 31.

An anode contact 35 is connected to the square silicon slab 31 by alloying. A aluminium foil of a square area of 8 x 8 mm.$^2$ is positioned on the square face 34 of the silicon slab 31. The aluminium foil 35 is covered with a Molybdan plate. As well the aluminium foil 35 as the Molybdan plate extends over the entire slab surface 34. A control electrode contact 38 which may be a rectangular gold foil 38 containing about 0.5 to 1 percent boron, is positioned on the square face 37 being spaced from the slab edge by a distance of about 1.5 mm. A cathode contact 39 which may be a rectangular gold-antimony foil, is positioned on the square face 37 in addition to the control electrode contact 38. The cathode contact 39 is also spaced from the slab edge by a distance of about 1.5 mm. and the two contacts 38 and 39 are spaced from each other by a distance of about 0.5 mm.

The electrode foils 35, 38 and 39 are alloyed to the slab 31 by heating the assemblage of slab and foils in a non-oxidizing atmosphere for example hydrogen gas, for about two minutes at a temperature of about 700° C. The alloying of the gold-antimony foil 39 takes place in a portion 40 of the p-conductive zone 32 bordering on the slab surface 37 and due to this alloying on n-conductive cathode layer 41 of 0.007 mm. thickness is produced. By the alloying of the gold-boron foil 38 a layer of higher p-conductivity in a portion of the p-conductive zone 32 bordering the gold-boron foil 38 is formed. By the heating process of the aluminium foil 35 alloys with the surface layer of the slab surface 34 and due to this alloying a layer of higher p-conductivity in a portion of the p-conductive zone 32 bordering the aluminium foil 35 is produced.

As shown in FIGURE 5, a bevel is provided by grinding the upper edge of the slab starting from the slab surface 37 and extending peripherally along the edge. The grinding is so performed that the orthogonal projection of the produced surface 51 on the slab surface 34 extends from lower edge of the square slab 31 by a distance of about 1 mm. and that the peripherally thickness of the slab is about 0.1 mm. The n-junction 42 between the n-conductive layer 33 and the p-conductive layer 32 is divided by grinding into two pn-junctions 43 and 44 which are not connected to each other as they would be in the case if the grinding had not been performed. The lines of intersection 52 and 53 of the two pn-junctions 43 and 44 respectively, with the bevelled surface 51 have a minimal spacing from each other along the surface 51, of about 0.59 mm. This spacing is longer than the shortest distance between the substantially parallel pn-junctions 43 and 44 being 0.16 mm.

Figure 1:
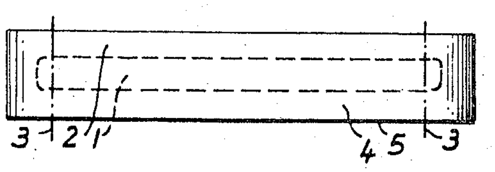
FIGURE 1 is a schematic side view of a first step of producing a semiconductor device in accordance with the prior art.
Figure 2:
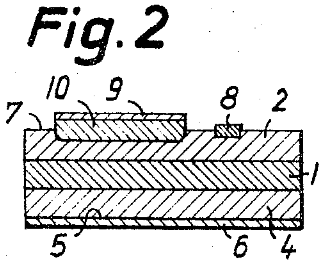
FIGURE 2 is a schematic sectional view illustrating the finished article of a prior art semiconductor device.

In the above example the distance of the line of intersection 52 of the pn-junction 43 from the lower edge of the slab is 0.17 mm. Thus the distance is longer than had previously been the case. As shown in FIGURE 2 the previously utilized device has only a distance between the anode contact 6 and the nearest pn-junction, along the surface side of the slab of 0.07 mm. The alloying of the anode contact 35 according to the invention can therefore not readily produce a short circuit between the anode contact 35 and the edge of the pn-junction 52 by spilling over of alloying material onto the sides of the slab 31.

It will be understood that the above description of the present invention is susceptible to various modifications, changes and adaptations, and the same are intended to be comprehended within the meaning and range of equivalents of the appended claims.

What is claimed is:

1. In a method of making a semiconductor device wherein a semiconductor slab of one type conductivity has a continuous zone of the opposite conductivity diffused thereinto and about the entire surface thereof to form an at least substantially uniform thickness using doping material of the opposite conductivity type, the improvement comprising the steps of:

(a) alloying an ohmic contact into one surface of the semiconductor slab which has a portion of one type conductivity extending at least substantially parallel to the slab surface and which portion is surrounded on all sides by a zone of the opposite conductivity type formed by diffusion, said contact extending up to the slab edge;

(b) connecting a rectifying contact and an ohmic contact on the other slab surface in a position spaced a certain distance from the slab edge; and then (c) grinding a chamfer at the slab edge starting from said other slab surface, the chamfering being performed along the entire periphery so that the pn-junction between the diffusion zone and the portion encompassed by the diffusion zone is separated into two pn-junctions which are no longer connected with each other and whose lines of intersection with the chamfered surface have a minimum spacing from each other along this surface which is larger than the shortest distance between the two pn-junctions which are formed.

2. In a method of making a semiconductor device by diffusing into a semiconductor slab of one type conductivity a zone of the other type conductivity which completely surrounds the portion of the one type conductivity and forms an at least substantially uniform thickness so that the portion of the one type conductivity extends at least substantially parallel to a slab surface by using doping material of the other type conductivity, and removing a sufficient amount of the peripheral portion of the slab to laterally expose the portion of the one type conductivity, the improvement comprising the steps of:

(a) alloying a contact into one surface which is of the other type conductivity so that the contact extends up to the edge of the slab;

(b) connecting at least one contact to the other slab surface and spaced a certain distance from the edge of the slab; and (c) grinding a chamfer at the slab edge starting from said other slab surface, the chamfering being performed along the entire periphery so that the pn-junction between the diffusion zone and the portion encompassed by the diffusion zone is separated into two pn-junctions which are no longer connected with each other and whose lines of intersection with the chamfered surface having a minimum spacing from each other along this surface which is larger than the shortest distance between the two pn-junctions which are formed.

3. A method as defined in claim 2 wherein said semiconductor slab is an n-conductive silicon slab and the diffusion zone is p-conductive, said first-mentioned contact being an anode contact and being alloyed to the slab surface in such a manner that an ohmic connection is formed, the contact connected to the other slab surface being a cathode contact which is alloyed to the surface to form a pn-junction during alloying, and further comprising the step of alloying a further and control electrode contact to said other slab surface and spaced from the slab edge by a certain distance and forming an ohmic connection with the slab surface to which it is connected.

4. A method as defined in claim 2 wherein the semiconductor slab is square.

5. A method as defined in claim 2 wherein the semiconductor slab is rectangular and the chamfered surface is ground to the shape of a truncated cone having a base which is parallel to the slab surface.

6. A method as defined in claim 2 wherein the chamfered surface is ground to the shape of a truncated pyramid having a base which is parallel to the slab surface.

7. A method as defined in claim 2 wherein the slab initially has the shape of a four-sided right-angled polygon and the chamfered surface is ground to the shape of a truncated pyramid with the edges of the base of the pyramid being disposed within the sides of the semiconductor slab.

8. A method as defined in claim 2 wherein the slab initially has the shape of a closed figure which is symmetrical in two perpendicular planes is of the same width in each of these planes, and the chamfered surface is ground to the shape of a truncated hemisphere with the base parallel to the slab surface.

9. A method as defined in claim 2 wherein the slab initially has the shape of a four-sided right-angled polygon and the chamfer is ground so that the surface formed is respectively of two portions of the surfaces of two circular cylinders, the axis of one circular cylinder being parallel to an edge of the semiconductor slab and the axis of the other circular cylinder being at right angles to the axis of the first-mentioned circular cylinder.

10. A method as defined in claim 2 wherein said semiconductor slab is an n-conductive silicon slab and the diffusion zone is p-conductive, said first-mentioned contact being a collector contact and being alloyed to the slab surface in such manner that an ohmic connection is formed, the contact connected to the other slab surface being a base contact which is alloyed to the surface to form a pn-junction during alloying, and further comprising the step of alloying a further and emitter electrode contact to said other slab surface and spaced from the slab edge by a certain distance and forming an ohmic connection with the slab surface to which it is connected.

11. In a method of making a semiconductor device by diffusing into a semiconductor slab of one type conductivity a zone of the other type conductivity which completely surrounds the portion of the one type conductivity and forms an at least susbtantially uniform thickness so that the portion of the one type conductivity extends at least substantially parallel to a slab surface by using doping material of the other type conductivity, and removing a sufficient amount of the peripheral portion of the slab to laterally expose the portion of the one type conductivity, the improvement comprising the steps of:

(a) alloying a single contact into one surface which is of the other type conductivity so that the contact extends up to the edge of the slab and forms an ohmic connection;

(b) connecting a single contact to the other slab surface and spaced a certain distance from the edge of the slab and forming an ohmic connection; and then (c) grinding a chamfer at the slab edge starting from said other slab surface, the chamfering being performed along the entire periphery so that the pn-junction between the diffusion zone and the portion encompassed by the diffusion zone is separated into two pn-junctions which are no longer connected with each other and whose lines of intersection with the chamfered surface have a minimum spacing from each other along this surface which is larger than the shortest distance between the two pn-junctions which are formed.

References Cited by the Examiner

UNITED STATES PATENTS

| | | | |
|---|---|---|---|
| 2,929,859 | 3/1960 | Loterski | 148—33.5 X |
| 2,975,085 | 3/1961 | Hunter | 148—33.5 X |
| 3,099,591 | 7/1963 | Shockley | 148—33.5 X |
| 3,111,590 | 11/1963 | Noyce | 148—33.5 X |

HYLAND BIZOT, *Primary Examiner.*